United States Patent

Omodaka (10) Patent No.: US 9,524,453 B2
(45) Date of Patent: Dec. 20, 2016

(54) IMAGE FORMING DEVICE, METHOD OF SWITCHING MODES, AND COMPUTER-READABLE RECORDING MEDIUM

(71) Applicant: Katsuhiko Omodaka, Kanagawa (JP)

(72) Inventor: Katsuhiko Omodaka, Kanagawa (JP)

(73) Assignee: RICOH COMPANY, LIMITED, Tokyo (JP)

(*) Notice: Subject to any disclaimer, the term of this patent is extended or adjusted under 35 U.S.C. 154(b) by 0 days.

(21) Appl. No.: 14/839,181

(22) Filed: Aug. 28, 2015

(65) Prior Publication Data
US 2016/0078332 A1 Mar. 17, 2016

(30) Foreign Application Priority Data

Sep. 16, 2014 (JP) .................................. 2014-188298
May 25, 2015 (JP) .................................. 2015-105652

(51) Int. Cl.
*G06K 15/00* (2006.01)
*G06K 15/02* (2006.01)

(52) U.S. Cl.
CPC ....... *G06K 15/4055* (2013.01); *G06K 15/1805* (2013.01); *G06K 15/1806* (2013.01); *G06K 15/405* (2013.01); *G06K 15/406* (2013.01); *G06K 15/4045* (2013.01)

(58) Field of Classification Search
CPC .............. G06K 15/4055; G06K 15/405; G06K 15/1805; G06K 15/406; G06K 15/1806; G06K 15/4045
USPC ........................................ 358/1.13, 1.14, 1.9
See application file for complete search history.

(56) References Cited

U.S. PATENT DOCUMENTS

| 8,891,117 B2* | 11/2014 | Takahashi ............. G06F 3/1229 358/1.13 |
| 2013/0057883 A1* | 3/2013 | Ohshima ............ H04N 1/00891 358/1.9 |
| 2013/0243467 A1 | 9/2013 | Yamanishi et al. |
| 2015/0067371 A1* | 3/2015 | Yamaguchi ........... G06F 1/3284 713/323 |

FOREIGN PATENT DOCUMENTS

JP 2013-192131 9/2013

* cited by examiner

*Primary Examiner* — Allen H Nguyen
(74) *Attorney, Agent, or Firm* — Harness, Dickey & Pierce, P.L.C.

(57) ABSTRACT

An image forming device comprises: a receiving unit that receives a request from an external device; an acquiring unit that acquires a port number indicated by the request received by the receiving unit and an information amount of the request; a first determining unit that determines whether or not the port number coincides with a specific port number; a second determining unit that determines whether or not the information amount is equal to or greater than a specific threshold; and a system control unit that switches an operation mode from a power-saving mode to a normal mode when the first determining unit determines that the port number coincides with the specific port number and the second determining unit determines that the information amount is equal to or greater than the specific threshold.

13 Claims, 8 Drawing Sheets

PORT MANAGEMENT TABLE 500

| PORT NUMBER | PROTOCOL | THRESHOLD |
|---|---|---|
| 21 | FTP | A |
| 22 | sshd/sftpd | A |
| 80 | http | A |
| 137 | NetBIOS-NS | B |
| 139 | NetBIOS SESSION SERVICE | B |
| 427 | SLP | B |
| 514 | rsh/rcp | B |
| 515 | LPR | C |
| 524 | NCP | C |
| 631 | IPP | C |

FIG.5

PORT MANAGEMENT TABLE 500a

| NECESSITY TO SWITCH TO NORMAL MODE | PORT NUMBER | PROTOCOL | THRESHOLD |
|---|---|---|---|
| NECESSARY | 21 | FTP | A |
| UNNECESSARY | 22 | sshd/sftpd | A |
| UNNECESSARY | 80 | http | A |
| UNNECESSARY | 137 | NetBIOS-NS | B |
| UNNECESSARY | 139 | NetBIOS SESSION SERVICE | B |
| UNNECESSARY | 427 | SLP | B |
| NECESSARY | 514 | rsh/rcp | B |
| NECESSARY | 515 | LPR | C |
| NECESSARY | 524 | NCP | C |
| NECESSARY | 631 | IPP | C |

PORT MANAGEMENT TABLE 500b

| NECESSITY TO SWITCH TO NORMAL MODE | PORT NUMBER | PROTOCOL | THRESHOLD (SET VALUE) |
|---|---|---|---|
| NECESSARY | 21 | FTP | 10000 |
| UNNECESSARY | 22 | sshd/sftpd | 2000 |
| UNNECESSARY | 80 | http | 3000 |
| UNNECESSARY | 137 | NetBIOS-NS | 6000 |
| UNNECESSARY | 139 | NetBIOS SESSION SERVICE | 7500 |
| UNNECESSARY | 427 | SLP | 9600 |
| NECESSARY | 514 | rsh/rcp | 25000 |
| NECESSARY | 515 | LPR | 37000 |
| NECESSARY | 524 | NCP | 15000 |
| NECESSARY | 631 | IPP | 8000 |

IMAGE FORMING DEVICE, METHOD OF SWITCHING MODES, AND COMPUTER-READABLE RECORDING MEDIUM

CROSS-REFERENCE TO RELATED APPLICATIONS

The present application claims priority to and incorporates by reference the entire contents of Japanese Patent Application No. 2014-188298 filed in Japan on Sep. 16, 2014 and Japanese Patent Application No. 2015-105652 filed in Japan on May 25, 2015.

BACKGROUND OF THE INVENTION

1. Field of the Invention

The present invention relates to an image forming device, a method of switching modes, and a computer-readable recording medium.

2. Description of the Related Art

An image forming device has operation modes including a power-saving mode for reducing the power consumption caused by operating a device such as an engine unit and a normal mode for prioritizing the operation of the device such as an engine unit, and power-saving control techniques that switch between the operation modes according to the current status are applied to such an image forming device.

As an image forming device with such power-saving control techniques, a device has been developed that determines, upon an access to the image forming device from the outside during the power-saving mode, whether to continue the power-saving mode or to switch the mode to the normal mode allowing a printing operation according to settings set by a user (see Japanese Laid-open Patent Publication No. 2013-192131).

With the technique described in Japanese Laid-open Patent Publication No. 2013-192131, however, the device is switched from the power-saving mode to the normal mode upon an access to a specific port number from the outside, and this configuration problematically increases the power consumption.

From the above-described viewpoints, there is a need to provide an image forming device, a method of switching modes, and a computer-readable recording medium containing a computer program that reduce the power consumption.

SUMMARY OF THE INVENTION

It is an object of the present invention to at least partially solve the problems in the conventional technology.

According to the present invention, there is provided an image forming device comprising: a receiving unit that receives a request from an external device; an acquiring unit that acquires a port number indicated by the request received by the receiving unit and an information amount of the request; a first determining unit that determines whether or not the port number coincides with a specific port number; a second determining unit that determines whether or not the information amount is equal to or greater than a specific threshold; and a system control unit that switches an operation mode from a power-saving mode to a normal mode when the first determining unit determines that the port number coincides with the specific port number and the second determining unit determines that the information amount is equal to or greater than the specific threshold.

The present invention also provides a method of switching modes, comprising: receiving a request from an external device; acquiring a port number indicated by the received request and an information amount of the request; firstly determining whether or not the port number coincides with a specific port number; secondly determining whether or not the information amount is equal to or greater than a specific threshold; and switching an operation mode from a power-saving mode to a normal mode if the port number is determined to coincide with the specific port number and the information amount is determined to be equal to or greater than the specific threshold.

The present invention also provides a non-transitory computer-readable recording medium that contains a computer program that causes a computer to function as: an acquiring unit that acquires a port number indicated by a request received by a receiving unit that receives the request from an external device and an information amount of the request; a first determining unit that determines whether or not the port number coincides with a specific port number; a second determining unit that determines whether or not the information amount is equal to or greater than a specific threshold; and a system control unit that switches an operation mode from a power-saving mode to a normal mode when the first determining unit determines that the port number coincides with the specific port number and the second determining unit determines that the information amount is equal to or greater than the specific threshold.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of an image forming device and a method and a computer-readable recording medium that contains a computer program of switching modes according to the present invention will be described in detail with reference to FIGS. 1 to 9. Examples of the image forming device according to the present invention include an electrophotographic image forming device and a multifunction peripheral (MFP). The multifunction peripheral is a device having at least two functions of a printing function, a copying function, a scanner function, and a facsimile function.

The following embodiments are not intended to limit the present invention. Structural elements in the following embodiments include elements that the skilled person could have easily conceived, substantially identical elements, and equivalent elements. Moreover, various omissions, substitutions, and changes of the structural elements may be made without departing from the spirit of the following embodiments.

First Embodiment

Hardware Configuration of Image Forming Device

Figure 1:
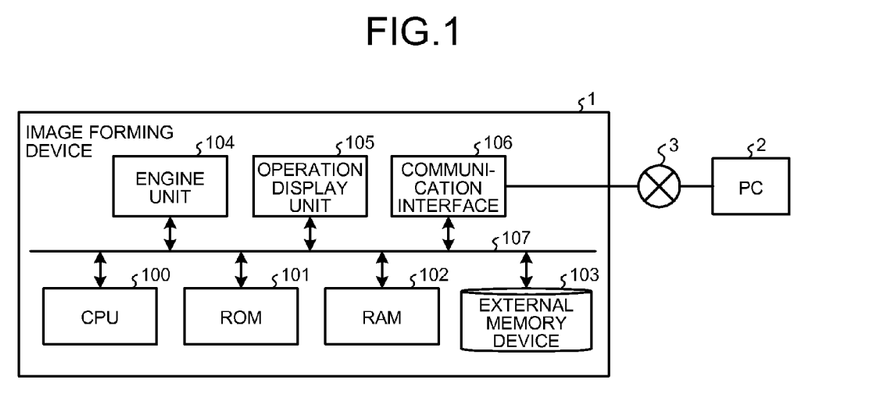
FIG. 1 is a diagram illustrating a general configuration of hardware of an image forming device according to a first embodiment of the present invention.

FIG. 1 is a diagram illustrating a general configuration of hardware of the image forming device according to a first embodiment of the present invention. The hardware configuration of an image forming device 1 according to the first embodiment will be described with reference to FIG. 1.

As illustrated in FIG. 1, the image forming device 1 includes a central processing unit (CPU) 100, a read only memory (ROM) 101, a random access memory (RAM) 102, an external memory device 103, an engine unit 104, an operation display unit 105, and a communication interface 106. These units are communicably connected with one another via a bus 107.

The CPU 100 is a calculation device for controlling the overall operation of the image forming device 1. The ROM 101 is a non-volatile storage device storing therein a computer program used for the image forming device 1. The RAM 102 is a volatile storage device serving as a work area used by the CPU 100 for calculation.

The external memory device 103 is a device storing therein various kinds of data such as image data and printing data. Examples of the external memory device 103 include a hard disk drive (HDD) and a solid state drive (SSD).

The engine unit 104 is a hardware device that implements a scanner function, a printer function, and the like. The scanner function is a function for reading draft data and generating a scanner image. The printer function is a function for performing image processing on the above-described scanner image or image data transmitted from a later-described personal computer (PC) 2 and printing a plotter image, which is in a format that can be output, on printing paper.

Examples of the operation display unit 105 include a touch panel. The operation display unit 105 is a device that receives an input to the image forming device 1 and displays the status and the like of the image forming device 1.

The communication interface 106 is an interface for communicating data using a later-described network 3.

The image forming device 1 is connected with the network 3 in a manner communicable with the personal computer (PC) 2 (an external device).

The PC 2 is a common information processing device that transmits printing data such as an edited document to the image forming device 1 via the network 3 and requests the image forming device 1 to print the data. The network 3 is a network that implements data communication in accordance with a protocol such as the Transmission Control Protocol/Internet Protocol (TCP/IP).

Configuration of Functional Blocks of the Image Forming Device

Figure 2:
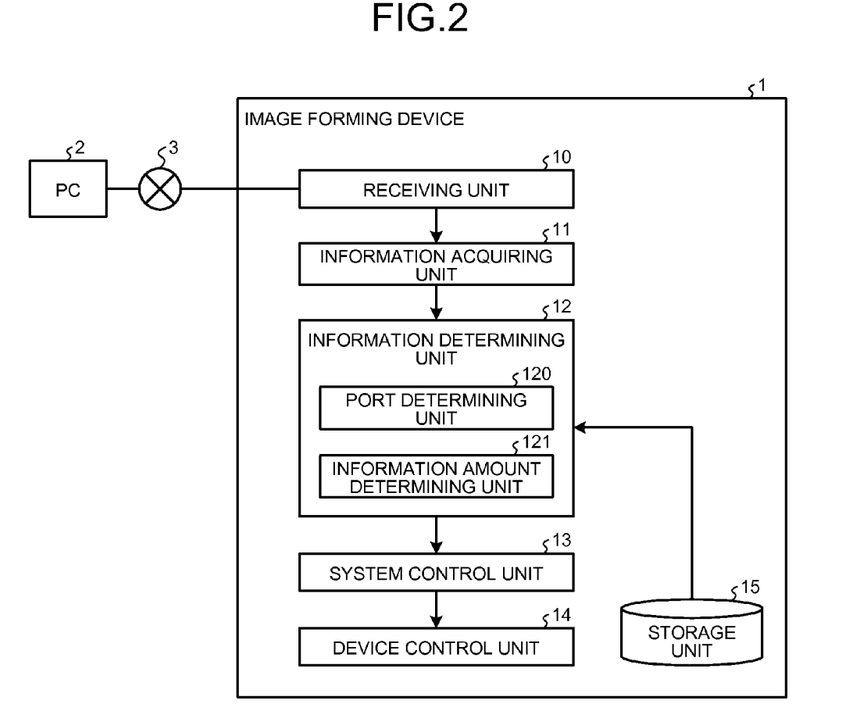
FIG. 2 is a diagram illustrating an exemplary configuration of functional blocks of the image forming device according to the first embodiment.

FIG. 2 is a diagram illustrating an exemplary configuration of functional blocks of the image forming device according to the first embodiment. The configuration of the functional blocks of the image forming device 1 according to the embodiment will now be described with reference to FIG. 2.

As illustrated in FIG. 2, the image forming device 1 includes a receiving unit 10, an information acquiring unit 11, an information determining unit 12, a system control unit 13, a device control unit 14, and a storage unit 15.

The receiving unit 10 is a functional unit that receives a request to the image forming device 1 from the outside (hereinafter referred to as an external request) in accordance with a certain communication protocol. As an example of the external request, the receiving unit 10 receives, from the PC 2 via the network 3, a request to acquire information on the status (such as the status of operation, the remaining amount of toner, and functional information) of the image forming device 1, a request of a printing operation, and the like. The receiving unit 10 is implemented by the communication interface 106 illustrated in FIG. 1.

The information acquiring unit 11 is a functional unit that acquires a port number to be used and an information amount of the external request itself from the external request received by the receiving unit 10. The information acquiring unit 11 acquires, for example, "80" as a port number to be used and "30 kB" as the information amount of the external request itself from the external request received by the receiving unit 10 in accordance with the hypertext transfer protocol (HTTP). The information acquiring unit 11 is implemented by a computer program executed by the CPU 100 illustrated in FIG. 1. The information acquiring unit 11 may acquire the information amount in the form of a value directly indicating the amount of information such as the number of bytes as described above or in the form of an index value indicating the size of the information amount.

The information determining unit 12 is a functional unit that performs a predetermined determining operation on the port number and the information amount of the external request acquired by the information acquiring unit 11 and determines whether the external request is information requesting a printing operation (hereinafter simply referred to as a printing request). The information determining unit 12 includes a port determining unit 120 (first determining unit) and an information amount determining unit 121 (second determining unit). The information determining unit 12 is implemented by a computer program executed by the CPU 100 illustrated in FIG. 1.

The port determining unit 120 is a functional unit that determines whether or not the port number of the external request acquired by the information acquiring unit 11 coincides with a specific port number. The information amount determining unit 121 is a functional unit that determines whether or not the information amount of the external request acquired by the information acquiring unit 11 exceeds a specific threshold.

The system control unit 13 is a functional unit that manages an application installed on the image forming device 1 and the overall status of the image forming device 1. The system control unit 13 controls a switch between operation modes of the image forming device 1. Examples of the operation modes include a power-saving mode for reducing the power consumption in the image forming device 1 and a normal mode for performing a normal operation with the power-consumption reducing operation released. The system control unit 13 is implemented by a computer program executed by the CPU 100 illustrated in FIG. 1.

The device control unit 14 is a functional unit that controls the operation of a device in the image forming device 1 and the status of the power source of the device. The device control unit 14, for example, turns off the power source of a specific device when the operation mode of the image forming device 1 is a power-saving mode, and turns on the power source of the device when the operation mode is a normal mode. The device is a part whose operation is controlled by the device control unit 14, and examples of the device include the engine unit 104 (such as a printing unit having the above-described printer function) and the operation display unit 105 illustrated in FIG. 1. The device control unit 14 is implemented by a computer program executed by the CPU 100 illustrated in FIG. 1.

The storage unit 15 is a functional unit that stores therein various kinds of data such as image data and printing data and a port management table 500 described later in FIG. 3. The storage unit 15 is implemented by the external memory device 103 illustrated in FIG. 1.

Some of or all of the information acquiring unit 11, the information determining unit 12, the system control unit 13, and the device control unit 14 illustrated in FIG. 2 may be implemented by a hardware circuit such as the application specific integrated circuit (ASIC) and the field-programmable gate array (FPGA) instead of a computer program as software.

The information acquiring unit 11, the information determining unit 12, the system control unit 13, and the device control unit 14 are functions represented in a conceptual manner, and the embodiment is not limited to this configuration.

Port Management Table

Figure 3:
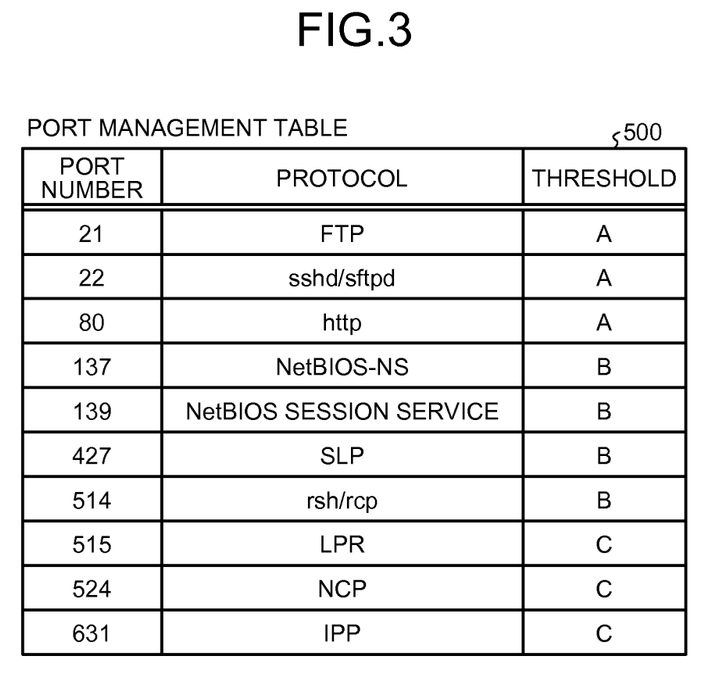
FIG. 3 is a diagram illustrating an exemplary port management table of the first embodiment.

FIG. 3 is a diagram illustrating an exemplary port management table of the first embodiment. The port management table 500 of the embodiment will now be described.

The port management table 500 (management information) illustrated in FIG. 3 is a table used by the information determining unit 12 for determining whether or not the external request received by the receiving unit 10 is a printing request. The port management table 500 manages various kinds of protocols, respective port numbers assigned to the protocols used by an application relating to printing, and respective thresholds used for comparison with the information amounts of external requests corresponding to the protocols, in a manner associated with one another.

For example, the port management table 500 illustrated in FIG. 3 indicates that a record having the Internet printing protocol (IPP) as the protocol indicates "631" as the port number and "C" representing a specific information amount as the threshold.

Operation-Mode-Switch Determining Operation

Figure 4:
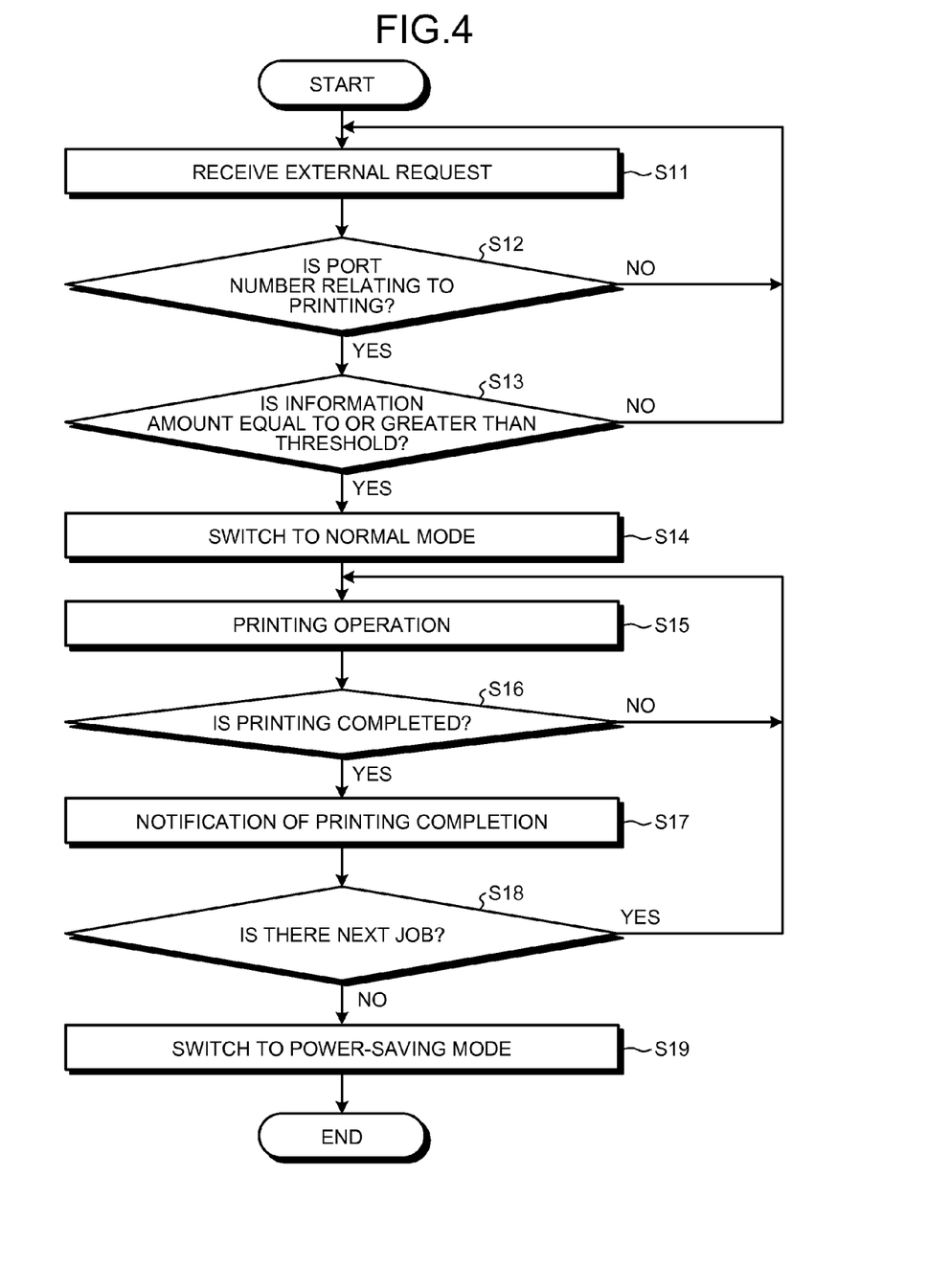
FIG. 4 is a flowchart illustrating an exemplary operation-mode-switch determining operation in the first embodiment.

FIG. 4 is a flowchart that illustrates an exemplary operation-mode-switch determining operation in the first embodiment. The operation-mode-switch determining operation in the image forming device 1 according to the embodiment will now be described with reference to FIG. 4. In the flowchart illustrated in FIG. 4, the device is preset to a power-saving mode.

Step S11

The receiving unit 10 of the image forming device 1 receives an external request from an external device such as the PC 2 via the network 3. The process proceeds to Step S12.

Step S12

The information acquiring unit 11 of the image forming device 1 acquires a port number to be used and the information amount of the external request itself from the external request received by the receiving unit 10. The port determining unit 120 in the information determining unit 12 of the image forming device 1 determines whether or not the port number of the external request acquired by the information acquiring unit 11 coincides with a port number included in the port management table 500 stored in the storage unit 15, in other words, whether or not the external request is a printing request. If the port number of the external request coincides with a port number included in the port management table 500 (Yes at Step S12), the process proceeds to Step S13. If the port number coincides with no port numbers included in the port management table 500 (No at Step S12), the process returns to Step S11.

Step S13

The information amount determining unit 121 in the information determining unit 12 of the image forming device 1 determines, based on the port management table 500, whether or not the information amount of the external request acquired by the information acquiring unit 11 is equal to or greater than the threshold associated with the port number of the external request. If the information amount of the external request is equal to or greater than the threshold (Yes at Step S13), the process proceeds to Step S14. If the information amount is smaller than the threshold (No at Step S13), the process returns to Step S11.

Step S14

The system control unit 13 of the image forming device 1 determines that the external request received by the receiving unit 10 is a printing request with an information amount unprocessable in the power-saving mode and switches the operation mode from the power-saving mode to the normal mode. When the system control unit 13 switches the mode to the normal mode, the device control unit 14 of the image forming device 1 turns on the power source of a specific device where the power source has been off. The process proceeds to Step S15.

Step S15

The device control unit 14 causes the engine unit 104 to perform a printing operation according to the external request. The process proceeds to Step S16.

Step S16

If the printing operation performed by the engine unit 104 is completed (Yes at Step S16), the process proceeds to Step S17. If the printing operation is not yet completed (No at Step S16), the process returns to Step S15 for continuing the printing operation.

Step S17

When the printing operation performed by the engine unit 104 is completed, the device control unit 14 sends a printing-completion notification to the system control unit 13. The process proceeds to Step S18.

Step S18

When the system control unit 13 receives the printing-completion notification from the device control unit 14, the system control unit 13 determines whether or not the next printing job to perform the printing operation exists. If the next printing job exists (Yes at Step S18), the process returns to Step S15. If no printing jobs are left (No at Step S18), the process proceeds to Step S19.

Step S19

When the engine unit 104 has completed all printing operations according to the external request, the system control unit 13 returns the operation mode from the normal mode to the power-saving mode.

The operation-mode-switch determining operation ends with the above-described operation. When the receiving unit 10 receives a new external request, the processing of Steps S11 to S19 is repeated.

As described above, when the image forming device 1 receives an external request from the outside (such as the PC 2) during the power-saving mode and determines that, using the port management table 500, the external request is a printing request based on the port number and that the external request has an information amount unprocessable in the power-saving mode, the image forming device 1 switches the operation mode to the normal mode. Furthermore, when all printing operations according to the external request are completed, the image forming device 1 returns the operation mode from the normal mode to the power-saving mode. This process can prevent a switch of the operation mode from the power-saving mode to the normal mode when the external request is determined not to be a printing request based on the port number, thereby reducing the power consumption. Furthermore, even when the external request is a printing request, the image forming device 1 does not switch the operation mode to the normal mode if the information amount is determined to be processable in the power-saving mode based on a threshold determination on the information amount. This process can further reduce the power consumption.

FIG. 4 illustrates such a case where the information amount determining unit 121 makes a determination on the information amount of the external request (Step S13) after the port determining unit 120 makes a determination on the port number of the external request (Step S12); however, the embodiment is not limited to this order. Either one of the determinations can be made first.

Second Embodiment

An image forming device according to a second embodiment of the present invention will be described focusing on differences with the image forming device 1 according to the first embodiment. The image forming device according to the second embodiment has the same hardware configuration and the same configuration of functional blocks as those of the image forming device 1 illustrated in FIGS. 1 and 2. Such an operation will be described in the second embodiment that switches the mode to a normal mode exclusively upon receipt of an external request associated with a port number designated in the port management table even when the external request is a printing request.

Port Management Table

Figure 5:
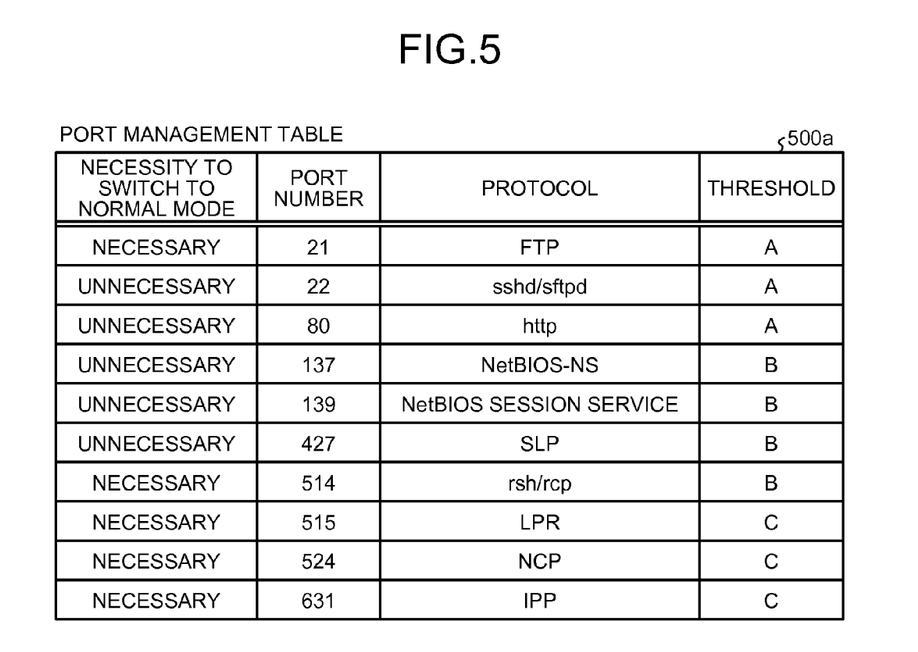
FIG. 5 is a diagram illustrating an exemplary port management table of a second embodiment of the present invention.

FIG. 5 is a diagram that illustrates an exemplary port management table of the second embodiment. A port management table 500a of the embodiment will be described with reference to FIG. 5.

The port management table 500a (management information) illustrated in FIG. 5 is a table used by the information determining unit 12 for determining whether or not the external request received by the receiving unit 10 is a printing request and is information of a designated port number. The port management table 500a manages, in a manner associated with one another, various kinds of protocols, respective port numbers assigned to the protocols used by an application relating to printing, necessity flags (referred to as "necessity to switch to the normal mode" in FIG. 5) indicating port numbers having the necessity to switch the mode to the normal mode among the port numbers, and respective thresholds used for comparison with the information amounts of external requests corresponding to the protocols.

For example, the port management table 500a illustrated in FIG. 5 indicates that a record having the line PRinter daemon protocol (LPR) as the protocol indicates "515" as the port number, "C" representing a specific information amount as the threshold, and "necessary" as the necessity flag.

Operation-Mode-Switch Determining Operation

Figure 6:
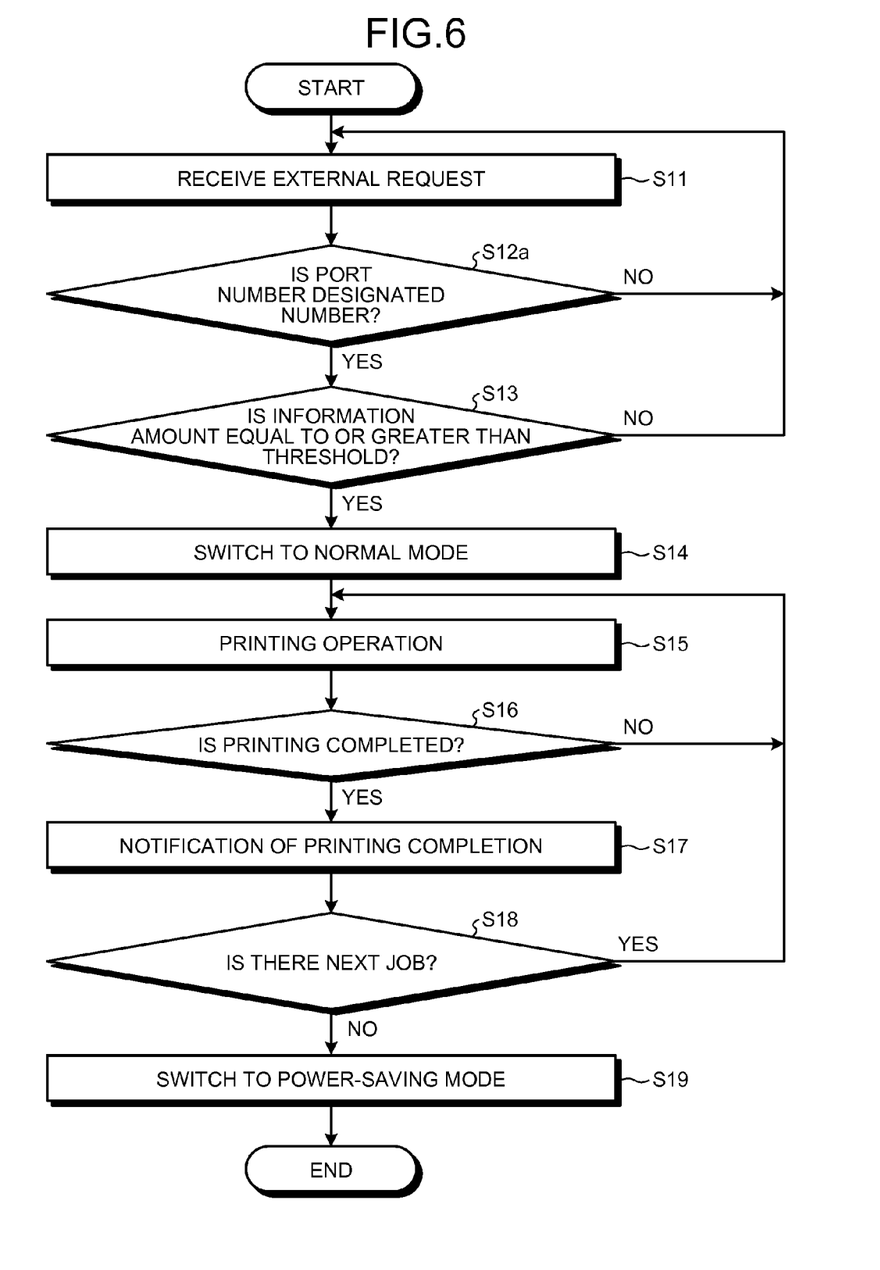
FIG. 6 is a flowchart illustrating an exemplary operation-mode-switch determining operation in the second embodiment.

FIG. 6 is a flowchart that illustrates an exemplary operation-mode-switch determining operation in the second embodiment. The operation-mode-switch determining operation in the image forming device according to the embodiment will now be described with reference to FIG. 6. In FIG. 6, the operation-mode-switch determining operation will be described focusing on differences with the operation-mode-switch determining operation in the image forming device 1 according to the first embodiment illustrated in FIG. 4. In the flowchart illustrated in FIG. 6, the device is preset to a power-saving mode.

Step S11

The receiving unit 10 of the image forming device receives an external request from an external device such as the PC 2 via the network 3. The process proceeds to Step S12a.

Step S12a

The information acquiring unit 11 of the image forming device acquires a port number to be used and the information amount of the external request itself from the external request received by the receiving unit 10. The port determining unit 120 of the information determining unit 12 in the image forming device determines whether or not the port number of the external request acquired by the information acquiring unit 11 is included in the port management table 500a stored in the storage unit 15 and the necessity flag corresponding to the port number indicates "necessary". In other words, the port determining unit 120 determines whether or not the external request is a printing request and is designated to operate the device in the normal mode. If the port number of the external request is included in the port management table 500a and the necessity flag corresponding to the port number indicates "necessary" (Yes at Step S12a), the process proceeds to Step S13. On the other hand, if the port number for the external request is not included in the port management table 500a or if the necessity flag corresponding to the port number indicates "unnecessary" (No at Step S12a), the process returns to Step S11.

Steps S13 to S19

Steps S13 to S19 are the same as Steps S13 to S19 in the operation-mode-switch determining operation described in the first embodiment illustrated in FIG. 4.

As described above, the image forming device according to the second embodiment switches the operation mode to the normal mode when determining, upon receipt of an external request, using the port management table 500a, that the external request is a printing request based on the port number, that the port number is designated to operate the device in the normal mode based on the necessity flag, and that the external request is unprocessable in the power-saving mode based on the information amount. When all printing operations according to the external request have been completed, the image forming device returns the operation mode from the normal mode to the power-saving mode. This process can prevent a switch of the operation mode from the power-saving mode to the normal mode if the external request is determined not to be a printing request based on the port number, thereby reducing the power consumption. Even when the external request is determined to be a printing request, the operation mode is not switched from the power-saving mode to the normal mode without designation to operate the device in the normal mode. This process can improve convenience of the image forming device. Furthermore, the operation mode is not switched to the normal mode if the information amount is determined to be processable in the power-saving mode based on a threshold determination on the information amount. This process can further reduce the power consumption.

The necessity flags in the port management table 500a may be editable by a setting unit (not illustrated) implemented by the operation display unit 105. This configuration can further improve the convenience of the image forming device.

Third Embodiment

An image forming device according to a third embodiment of the present invention will be described focusing on differences with the image forming device according to the second embodiment. The image forming device according to the third embodiment has the same hardware configuration as that of the image forming device 1 illustrated in FIG. 1. In the third embodiment, a setting unit can set a threshold in the port management table, and such an operation will be described that makes determination on the information amount of an external request using the set threshold.

Configuration of Functional Blocks of the Image Forming Device

Figure 7:
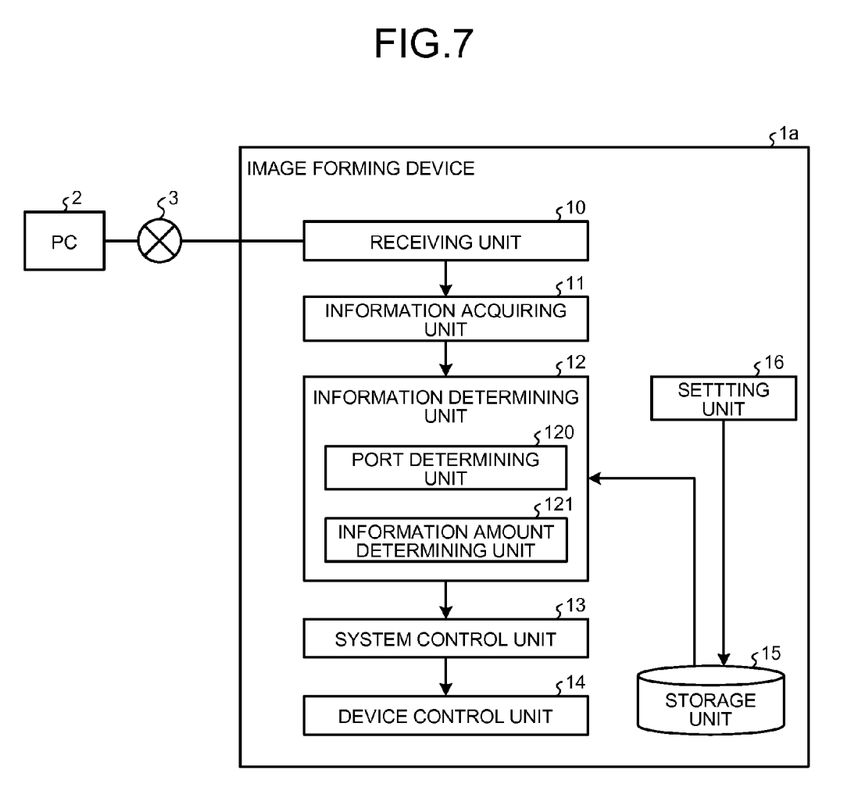
FIG. 7 is a diagram illustrating an exemplary configuration of functional blocks of an image forming device according to a third embodiment of the present invention.

FIG. 7 is a diagram that illustrates an exemplary configuration of functional blocks of the image forming device according to a third embodiment of the present invention. The configuration of functional blocks of an image forming device 1a according to the embodiment will be described with reference to FIG. 7.

As illustrated in FIG. 7, the image forming device 1a includes the receiving unit 10, the information acquiring unit 11, the information determining unit 12, the system control unit 13, the device control unit 14, the storage unit 15, and a setting unit 16. The image forming device 1a illustrated in FIG. 7 has the setting unit 16 as an additional component to the image forming device 1 illustrated in FIG. 2.

The storage unit 15 is a functional unit that stores therein various kinds of data such as image data and printing data and a port management table 500b described later in FIG. 8. The storage unit 15 is implemented by the external memory device 103 illustrated in FIG. 1.

The setting unit 16 is a functional unit that edits and sets a threshold in the port management table 500b described later in FIG. 8. The setting unit 16 is implemented by the operation display unit 105 illustrated in FIG. 1.

Port Management Table

Figure 8:
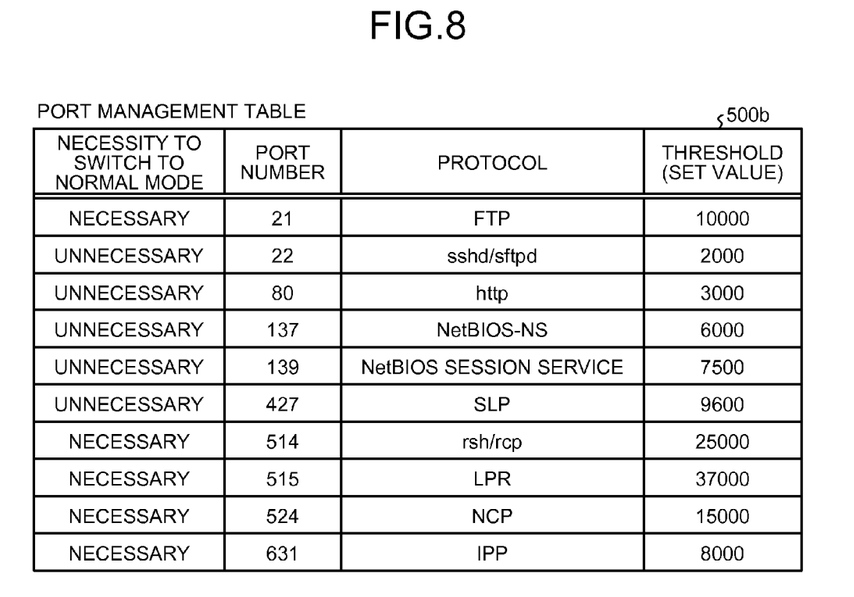
FIG. 8 is a diagram illustrating an exemplary port management table of the third embodiment.

FIG. 8 is a diagram that illustrates an exemplary port management table of the third embodiment. The port management table 500b of the embodiment will now be described with reference to FIG. 8.

The port management table 500b (management information) illustrated in FIG. 8 differs from the port management table 500a in the second embodiment in that the setting unit 16 can set a threshold associated with a port number. The port management table 500b manages, in a manner associated with one another, various kinds of protocols, respective port numbers assigned to the protocols used by an application relating to printing, necessity flags (referred to as "necessity to switch to the normal mode" in FIG. 8) (designation information) indicating port numbers having the necessity to switch to the normal mode among the port numbers, and respective thresholds used for comparison with the information amounts of external requests corresponding to the protocols and can be set by the setting unit 16. Each value indicated in the threshold field in the port management table 500b is an exemplary set value.

For example, the port management table 500b illustrated in FIG. 8 indicates that a record having the file transfer protocol (FTP) as the protocol indicates "21" as the port number, "necessary" as the necessity flag, and "10000" (in bytes, for example) as the threshold set by the setting unit 16.

Operation-Mode-Switch Determining Operation

Figure 9:
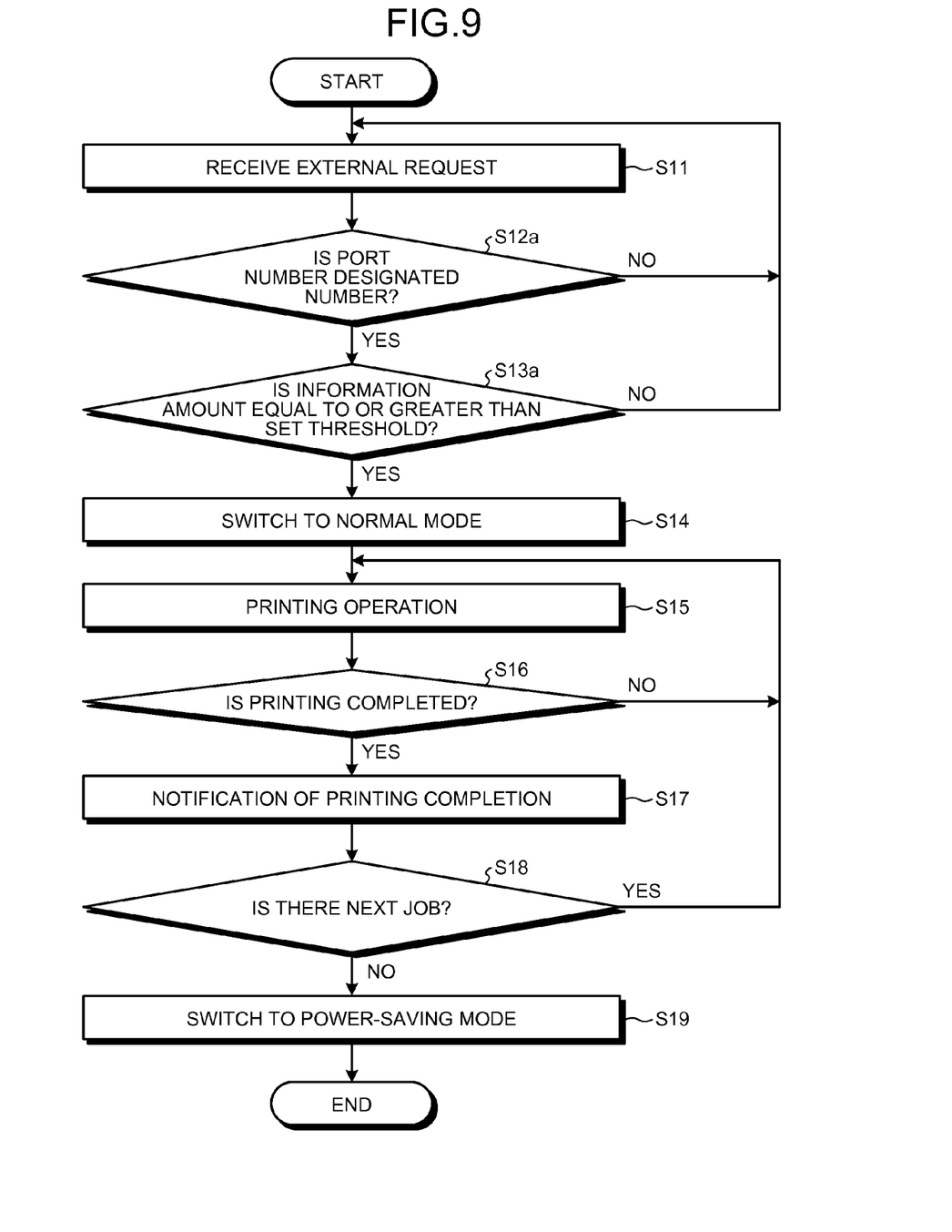
FIG. 9 is a flowchart illustrating an exemplary operation-mode-switch determining operation in the third embodiment.

FIG. 9 is a flowchart that illustrates an exemplary operation-mode-switch determining operation in the third embodiment. The operation-mode-switch determining operation performed by the image forming device 1a according to the embodiment will now be described with reference to FIG. 9. In FIG. 9, the operation-mode-switch determining operation will be described focusing on differences with the operation-mode-switch determining operation in the image forming device according to the second embodiment illustrated in FIG. 6. In the flowchart illustrated in FIG. 9, the device is preset to a power-saving mode.

Step S11

The receiving unit 10 of the image forming device 1a receives an external request from an external device such as the PC 2 via the network 3. The process proceeds to Step S12a.

Step S12a

The information acquiring unit 11 of the image forming device 1a acquires a port number to be used and the information amount of the external request itself from the external request received by the receiving unit 10. The port determining unit 120 of the information determining unit 12 in the image forming device determines whether or not the port number of the external request acquired by the information acquiring unit 11 is included in the port management table 500b stored in the storage unit 15 and the necessity flag corresponding to the port number indicates "necessary". In other words, the port determining unit 120 determines whether or not the external request is a printing request and is designated to operate the device in the normal mode. If the port number of the external request is included in the port management table 500b and the necessity flag corresponding to the port number indicates "necessary" (Yes at Step S12a), the process proceeds to Step S13a. On the other hand, if the port number of the external request is not included in the port management table 500b or if the necessity flag indicates "unnecessary" (No at Step S12a), the process returns to Step S11.

Step S13a

The information amount determining unit 121 of the information determining unit 12 in the image forming device 1a determines, based on the port management table 500b, whether or not the information amount of the external request acquired by the information acquiring unit 11 is equal to or greater than a threshold associated with the port number of the external request. If the information amount of the external request is equal to or greater than the threshold (Yes at Step S13a), the process proceeds to Step S14. If the information amount is smaller than the threshold (No at Step S13a), the process returns to Step S11.

Steps S14 to S19

Steps S14 to S19 are the same as Steps S14 to S19 in the operation-mode-switch determining operation described in the second embodiment illustrated in FIG. 6.

As described above, the image forming device 1a allows the setting unit 16 to set a threshold in the port management table 500b. This configuration makes a threshold, which is used for determining whether an external request determined to be a printing request based on the port number is processed in the power-saving mode or in the normal mode, editable, thereby improving convenience of the image forming device 1a. In other points, the image forming device 1a exerts the same advantageous effects as those of the image forming device according to the second embodiment.

The setting unit 16 sets a threshold in the port management table 500b; however, the embodiment is not limited thereto. The setting unit 16 may set a necessity flag (referred to as "necessity to switch to the normal mode" in FIG. 8).

Furthermore, in the above-described embodiments, the port management tables 500, 500a, and 500b serve as information in a table format; however, the embodiments are not limited thereto. Information in any formats is applicable as long as values in the respective fields in each table are managed in a manner associated with one another.

Furthermore, in the above-described embodiments, port numbers managed by the port management tables 500, 500a, and 500b are used for determining whether or not an external request is a printing request; however, the embodiments are not limited thereto. For example, regardless of whether or not an external request is a printing request, the port numbers may be used for determining whether or not the information increases load of processing in the power-saving mode.

When at least one of the information acquiring unit 11, the port determining unit 120 and the information amount determining unit 121 of the information determining unit 12, the system control unit 13, and the device control unit 14 in the above-described embodiments is implemented by executing a computer program, the computer program is preliminarily embedded in a read only memory (ROM) or the like and provided. The computer program executed by the image forming device in each of the above-described embodiments may be recorded in a non-transitory computer-readable recording medium such as a compact disc read only memory (CD-ROM), a flexible disk (FD), a compact disc recordable (CD-R), and a digital versatile disc (DVD) in an installable or executable file format and provided. Furthermore, the computer program executed by the image forming device in each of the above-described embodiments may be stored in a computer connected to a network such as the Internet and provided by being downloaded via the network. The computer program executed by the image forming device in each of the above-described embodiments may be provided or distributed through a network such as the Internet. The computer program executed by the image forming device in each of the above-described embodiments has a module configuration including at least one of the information acquiring unit 11, the port determining unit 120 and the information amount determining unit 121 of the information determining unit 12, the system control unit 13, and the device control unit 14 as described above. As an actual hardware operation, the CPU 100 reads out the computer program from the ROM 101 and executes the computer program, whereby each of the above-described units is loaded on a main memory device and generated.

According to the embodiments of the present invention, the power consumption can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming device comprising:
   memory storing computer-readable instructions;
   one or more processors configured to execute the instructions such that the one or more processors are configured to,
      receive an external request from an external device;
      acquires a port number indicated by the external and an information amount of the external request;
      determine whether the external request is a printing request by determining whether or not the port number coincides with a specific port number; and
      when the external request is the printing request,
         determine whether or not the information amount of the printing request is equal to or greater than a specific threshold; and
         switch an operation mode from a power-saving mode to a normal mode when the information amount of the printing request is equal to or greater than the specific threshold.

2. The image forming device according to claim 1, further comprising:
   a storage unit that stores therein management information associating the specific port number and the specific threshold with each other,
   wherein the one or more processors are configured to execute the instructions such that the one or more processors are configured to determine whether or not the information amount of the printing request is equal to or greater than the specific threshold associated with the specific port number.

3. The image forming device according to claim 2, wherein the management information associates, with the specific port number, designation information indicating necessity to determine whether or not the port number indicated by the external request coincides with the specific port number included in the management information.

4. The image forming device according to claim 3, wherein the one or more processors are configured to execute the instructions such that the one or more processors are configured to set the designation information included in the management information.

5. The image forming device according to claim 2, wherein the one or more processors are configured to execute the instructions such that the one or more processors are configured to set the specific threshold included in the management information.

6. The image forming device according to claim 1, wherein the specific port number coincides with the port number indicated by the printing request.

7. The image forming device according to claim 6, wherein the one or more processors are configured to execute the instructions such that the one or more processors are configured to,
   causes devices to execute a printing operation according to the printing request when the operation mode is switched from the power-saving mode to the normal mode, and switch the operation mode from the normal mode to the power-saving mode when the printing operation is completed.

8. The image forming device according to claim 7, wherein the one or more processors are configured to execute the instructions such that the one or more processors are configured to turn off a power source of at least one of the devices if the operation mode is the power-saving mode.

9. The image forming device according to claim 1, wherein the one or more processors are configured to execute the instructions such that the one or more processors are configured to acquire the information amount of the external request from the external request.

10. A method of switching modes, comprising:
receive an external request from an external device;
acquiring a port number indicated by the received request and an information amount of the external request;
determining whether the external request is a printing request by determining whether or not the port number coincides with a specific port number; and
when the external request is determined to be the printing request,
   determining whether or not the information amount of the printing request is equal to or greater than a specific threshold; and
   switching an operation mode from a power-saving mode to a normal mode if the information amount is determined to be equal to or greater than the specific threshold.

11. The method of claim 10, wherein the acquiring includes acquiring the information amount of the external request from the external request.

12. A non-transitory computer-readable recording medium storing computer-readable instructions that, when executed by one or more processors, cause the one or more processors to,
receive an external request from an external device;
acquire a port number indicated by the external request and an information amount of the external request;
determine whether the external request is a printing request by determining whether or not the port number coincides with a specific port number; and
when the external request is the printing request,
   determine whether or not the information amount of the printing request is equal to or greater than a specific threshold; and
   switch an operation mode from a power-saving mode to a normal mode when the information amount of the printing request is equal to or greater than the specific threshold.

13. The non-transitory computer-readable recording medium of claim 12, wherein the acquiring includes acquiring the information amount of the external request from the external request.

* * * * *